United States Patent
Lin et al.

(10) Patent No.: US 10,987,198 B2
(45) Date of Patent: Apr. 27, 2021

(54) IMAGE SIMULATION METHOD FOR ORTHODONTICS AND IMAGE SIMULATION DEVICE THEREOF

(71) Applicant: ASUSTEK COMPUTER INC., Taipei (TW)

(72) Inventors: Wei-Po Lin, Taipei (TW); Hao-Yuan Kuo, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 110 days.

(21) Appl. No.: 16/170,821

(22) Filed: Oct. 25, 2018

(65) Prior Publication Data
US 2019/0125492 A1 May 2, 2019

(30) Foreign Application Priority Data
Oct. 27, 2017 (CN) .......................... 201711057000.5

(51) Int. Cl.
*A61C 7/00* (2006.01)
*G06K 9/00* (2006.01)
(Continued)

(52) U.S. Cl.
CPC .......... *A61C 7/002* (2013.01); *G06K 9/00248* (2013.01); *G06K 9/4604* (2013.01); *G06K 9/6211* (2013.01); *G06T 2200/08* (2013.01)

(58) Field of Classification Search
None
See application file for complete search history.

(56) References Cited

U.S. PATENT DOCUMENTS

| 7,463,757 | B2 * | 12/2008 | Luo | G01J 3/50 |
| | | | | 382/128 |
| 8,591,225 | B2 * | 11/2013 | Wu | G06T 7/0014 |
| | | | | 433/24 |

(Continued)

FOREIGN PATENT DOCUMENTS

| CN | 102438545 B | 5/2012 |
| CN | 103079494 A | 5/2013 |

(Continued)

OTHER PUBLICATIONS

Nakasima et al., "Three-dimensional computer-generated head model reconstructed from cephalograms, facial photographs, and dental cast models," Am J Orthod Dentofacial Orthop. Mar. 2005; 127(3):282-92 (Year: 2005).*

(Continued)

*Primary Examiner* — Soo Shin
(74) *Attorney, Agent, or Firm* — Muncy, Geissler, Olds & Lowe, P.C.

(57) ABSTRACT

An image simulation method for orthodontics is provided. First, receive a face video and capturing a face image from the face video and find a plurality of face feature points on the face image to determine a mouth area. Then, acquire a tooth image in the mouth area. Define a plurality of tooth image feature points according to the tooth image. Subsequently, compare a plurality of preset tooth model feature points of the stereo tooth model and the tooth image feature points, to adjust the preset tooth model feature points to conform to the tooth image feature points and further to form an adjusted stereo tooth model. Then, project the adjusted stereo tooth model to the face video. An image simulation device for orthodontics is also provided.

7 Claims, 8 Drawing Sheets

(51) Int. Cl.
*G06K 9/46* (2006.01)
*G06K 9/62* (2006.01)

(56) References Cited

U.S. PATENT DOCUMENTS

| | | | | |
|---|---|---|---|---|
| 9,336,336 | B2* | 5/2016 | Deichmann | A61C 13/0004 |
| 9,626,462 | B2* | 4/2017 | Somasundaram | G06T 13/20 |
| 9,775,491 | B2* | 10/2017 | Clausen | A61B 1/24 |
| 2011/0317872 | A1* | 12/2011 | Free | G06K 9/00248 |
| | | | | 382/103 |
| 2012/0095732 | A1* | 4/2012 | Fisker | A61C 5/20 |
| | | | | 703/1 |
| 2018/0185125 | A1* | 7/2018 | Salah | A61B 5/064 |
| 2019/0083219 | A1* | 3/2019 | Sharer | A61C 13/0004 |
| 2020/0066391 | A1* | 2/2020 | Sachdeva | A61C 5/30 |

FOREIGN PATENT DOCUMENTS

| | | |
|---|---|---|
| CN | 103079494 A | 5/2013 |
| WO | WO-2017/161454 A1 | 9/2017 |

OTHER PUBLICATIONS

Office Action dated Sep. 9, 2020 in Chinese Application No. 201711057000.5.

\* cited by examiner

IMAGE SIMULATION METHOD FOR ORTHODONTICS AND IMAGE SIMULATION DEVICE THEREOF

CROSS-REFERENCE TO RELATED APPLICATION

This application claims the priority benefit of Chinese application serial No. 201711057000.5, filed on Oct. 27, 2017. The entirety of the above-mentioned patent application is hereby incorporated by reference herein and made a part of the specification.

BACKGROUND OF THE INVENTION

Field of the Invention

The invention relates to an image simulation method, in particular to a computer image simulation method.

Description of the Related Art

The most likely dispute in orthodontics is that the patient's expected effect does not correspond to the actual condition after surgery. At present, the dentist only relies on verbal or two-dimensional static model photos to communicate with the patient before the orthodontics operation. This approach is prone to misconceptions and disputes.

BRIEF SUMMARY OF THE INVENTION

An image simulation method for orthodontics, comprising: receiving a face video and capturing a face image from the face video; finding a plurality of face feature points on the face image to determine a mouth area; acquiring a tooth image in the mouth area; defining a plurality of tooth image feature points according to the tooth image; comparing a plurality of preset tooth model feature points of the stereo tooth model and the tooth image feature points, to adjust the preset tooth model feature points to conform to the tooth image feature points and further to form an adjusted stereo tooth model; and projecting the adjusted stereo tooth model to the face video.

An image simulation device for orthodontics, comprising: a database, storing a preset stereo tooth model and a plurality of preset feature points corresponding to the stereo tooth model, the preset feature points including a plurality of preset face feature points and a plurality of preset tooth model feature points; an image capture unit, receiving a face video, and capturing a face image; a processing unit, electrically connecting with the database and the image capture unit, for finding a plurality of face feature points on the face image to determine a mouth area; acquiring a tooth image in the mouth area; defining a plurality of tooth image feature points according to the tooth image; comparing a plurality of preset tooth model feature points of the stereo tooth model and the tooth image feature points, to adjust the preset tooth model feature points to conform to the tooth image feature points and further to form an adjusted stereo tooth model; and projecting the adjusted stereo tooth model to the face video.

Through the image simulation method and the image simulation device provided, the preset three-dimensional tooth model is converted and adjusted into an actual tooth image, and the adjusted three-dimensional tooth model is projected on a face video in real time, so as to simulate an image video after orthodontics of a patient to provide reference and avoid the dispute.

These and other features, aspects, and advantages of the present invention will become better understood with regard to the following description, appended claims, and accompanying drawings.

DETAILED DESCRIPTION OF THE EMBODIMENTS

Specific embodiments of the present invention are described in more detail below with reference to the drawings. Advantages and features of the present invention are apparent from the description and appended claims. It should be noted that the drawings are in a very simplified form and both use non-precise proportions and are merely for convenience and clarity to assist the purpose of the embodiments of the present invention.

Figure 1:
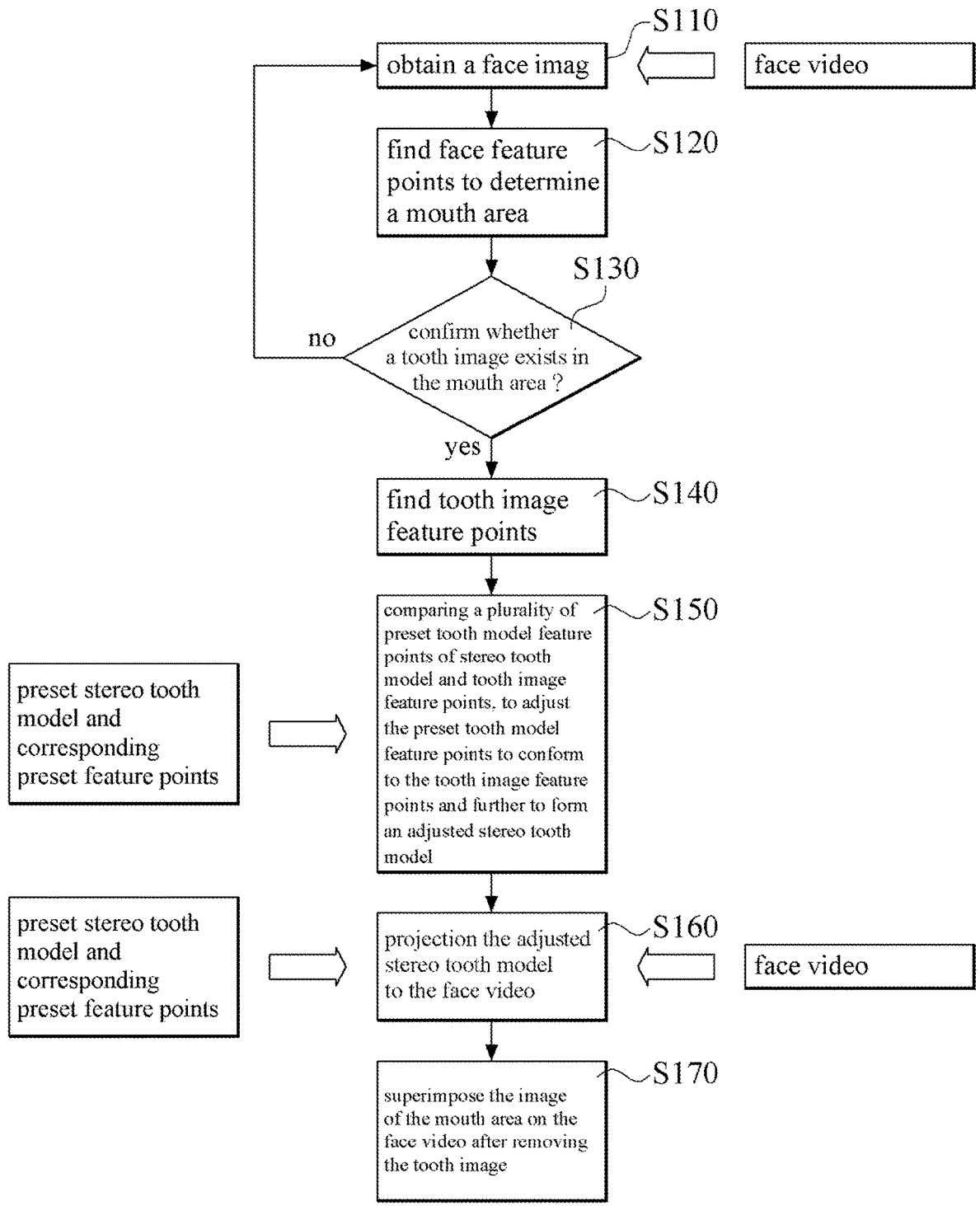
FIG. 1 is a flowchart of an image simulation method for orthodontics in an embodiment.

FIG. 1 is a flowchart of an image simulation method for orthodontics in an embodiment. As shown, the image simulation method includes following steps:

First, in step S110, a face video is received from a video source and a face image 300 is obtained therefrom. The video source is a video recorder, a video capture module of a cell phone, or an audio player or the like in an embodiment. The face video signal used in the step is not limited to the video which is captured in real time by the video source, and the pre-stored video is also applied to the embodiment.

Figure 2:
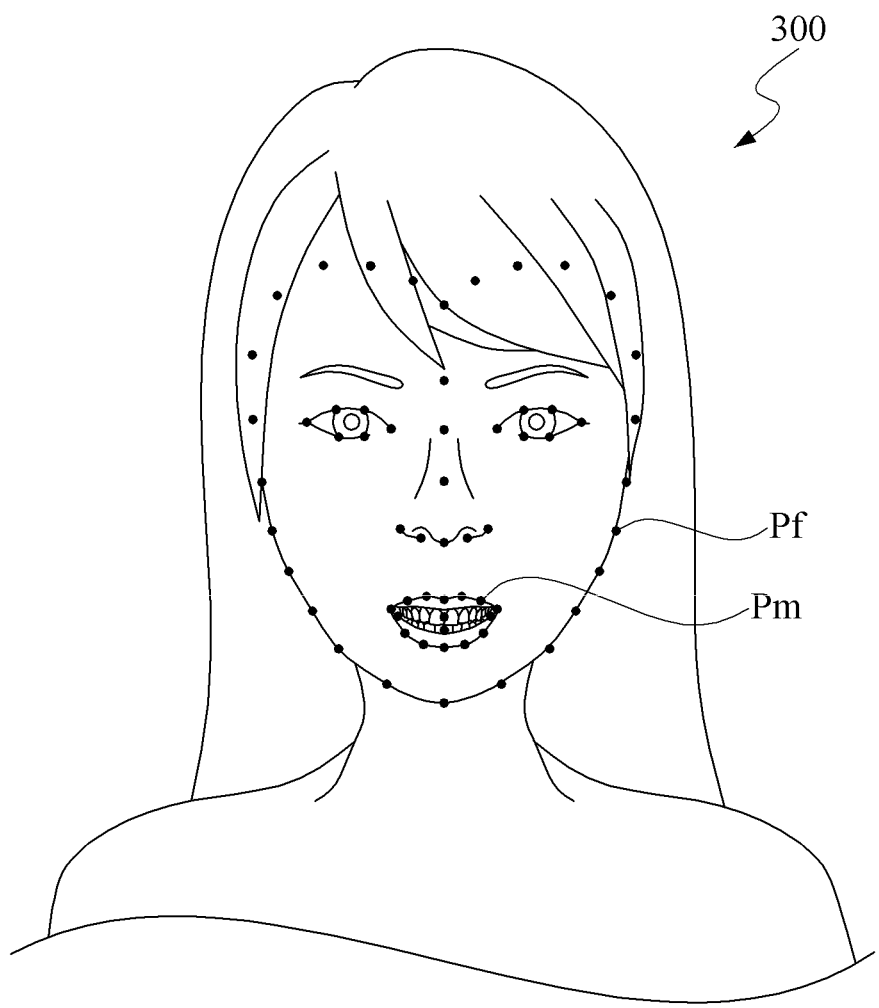
FIG. 2 is a schematic diagram of a face image captured in step S110 of FIG. 1 and a plurality of face feature points defined in step S120 in an embodiment.

Next, in step S120, a plurality of face feature points Pm, Pf are found from the captured face image 300 in accordance with a predetermined principle to determine a mouth area 320. FIG. 2 is a schematic diagram of a face image 300 captured in step S110 of FIG. 1 and a plurality of face feature points Pm, Pf defined in step S120 in an embodiment. For example, the position of the face feature points Pm, Pf are preset on specific positions, such as positions of eyebrows, eyes, a tip of a nose, a wing of a nose, the periphery of lips, and the periphery of a face. Then, the face feature points Pm, Pf are marked on the captured face picture 300 according to this preset principle.

Figure 3:
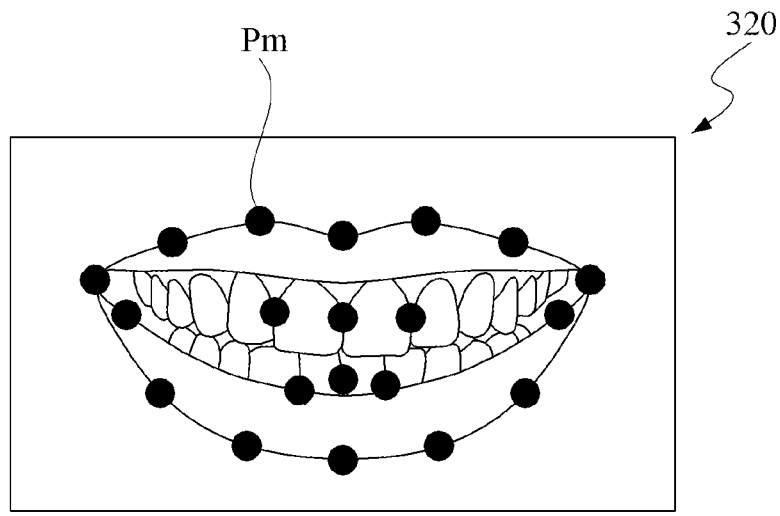
FIG. 3 is a schematic diagram of an image of a mouth area determined in step S120 of FIG. 1 in an embodiment.

After determining the positions of the face feature points Pm, Pf, a mouth area 320 is determined according to the relative position of the mouth area 320 in the face image, or according to the feature points of the face feature points Pm, Pf in accordance with the mouth area 320. FIG. 3 is a schematic diagram of an image of a mouth area determined in step S120 of FIG. 1 in an embodiment.

The feature points Pm in FIG. 3 is the face feature points corresponding to the mouth area among the face image feature point Pm, Pf. These feature points Pm is used to define the range of the mouth area 320 in an embodiment, which is not limited thereto. For example, since the mouth area 320 is roughly located in the lower third of the face, in another embodiment, the face area is also defined by determining a face area by the face feature points Pm, Pf and defining a range of one-third below the face area as the range of the mouth area.

Subsequently, in step S130, whether a tooth image 330 exists in the mouth area 320 or not is confirmed here. When there is a tooth image 330, the flow proceeds to step S140. When there is no tooth image 330, a caution signal is sent and the process is terminated at the same time. Users are allowed to choose to end the process or return to step S110 to recapture the face image 300.

When it is confirmed that the tooth image 330 does not exist, the process directly returns to step S110 to re-capture the face image in an embodiment, which is not limited thereto. For example, when it is confirmed that the tooth image 330 does not exist or the tooth image 330 is not clear enough to perform a subsequent step, a caution signal is issued to notify the operator of processing (e.g., to ask the person to be photographed to open the mouth to expose the tooth).

Figure 4:
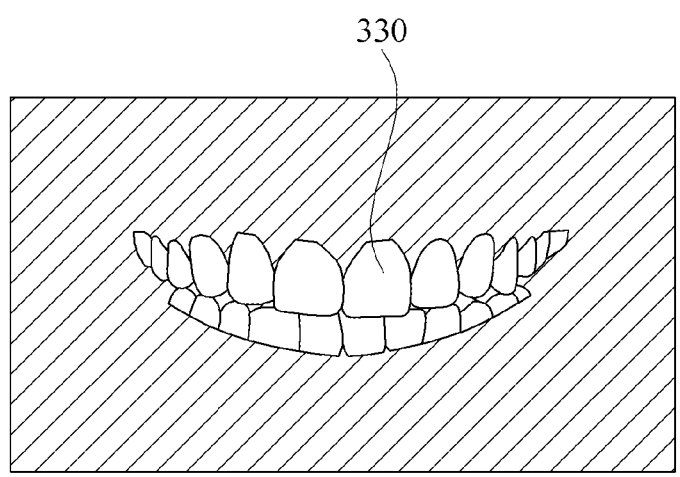
FIG. 4 is a schematic diagram of a tooth image found out from the mouth area of FIG. 3 in step S130 of FIG. 1 in an embodiment.

FIG. 4 is a schematic diagram of a tooth image 330 found out from the mouth area 320 of FIG. 3 in step S130 of FIG. 1 in an embodiment. As shown, since the color of the tooth portion is different from the color of the lips and the gingiva, the existence of the range of the tooth image is confirmed and the range of the tooth image is defined by comparing the color difference in the embodiment. In one embodiment, color conversion is performed to the image of the mouth area 320, such as the color conversion from RGB to LAB, to highlight the difference between the tooth portion and the surrounding region for determination.

Figure 5:
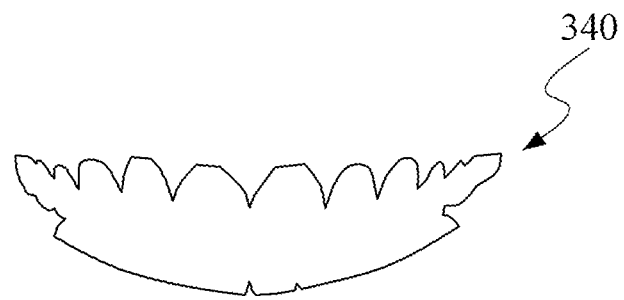
FIG. 5 is a schematic diagram of a tooth edge image generated after an edge detection of the tooth image of FIG. 4 in an embodiment.
Figure 6:
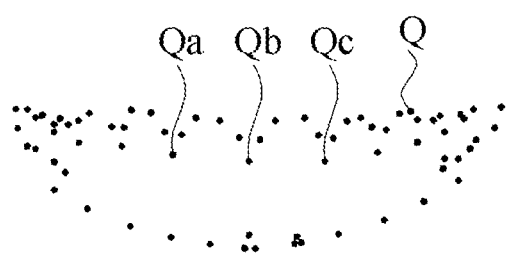
FIG. 6 is a schematic diagram of a plurality of candidate feature points found by a corner detection of the tooth edge image of FIG. 5 in an embodiment.

In step S140, a plurality of tooth image feature points Qa, Qb, and Qc are found from the tooth image 330 in accordance with the tooth image defined in step S130. Furthermore, please refer to FIG. 4 to FIG. 6. FIG. 5 is a schematic diagram of a tooth edge image 340 generated after an edge detection of the tooth image of FIG. 4 in an embodiment. FIG. 6 is a schematic diagram of a plurality of candidate feature points Q found by a corner detection of the tooth edge image 340 of FIG. 5 in an embodiment.

As shown in FIG. 5, in step S140, an edge detection is performed for the tooth image 330 to confirm the edge of the tooth image 330. The Sobel operator is used to perform the edge detection in an embodiment. Other edge detection methods, such as Prewitt operator, Canny edge detection, or the like, is also applied in an embodiment.

Next, as shown in FIG. 6, a corner detection is performed to define a plurality of candidate feature points x for the tooth edge image acquired after the edge detection (that is, the image 340 shown in FIG. 5). Harris corner detection is used to acquire the candidate feature points in the embodiment. Other angle detection methods, such as Moravec angle detection, Forstner angle detection, and the like, is also applied in an embodiment.

Next, referring to FIG. 3 and FIG. 6, the candidate feature points Q is compared with the face feature points Pm located in the mouth area, and the tooth image feature points Qa, Qb, Qc are defined from these candidate feature points Q. In an embodiment, in this step, feature points closest to the position of the face feature points Pm are found in these candidate feature points Q to be the tooth image feature points Qa, Qb, Qc.

Subsequently, in step S150, a plurality of preset tooth model feature points of a preset stereo tooth model are compared with the aforementioned tooth image feature points Qa, Qb, and Qc to adjust these preset tooth model feature points to conform to the tooth image feature points Qa, Qb, Qc and further to form an adjusted stereo tooth model.

Figure 7:
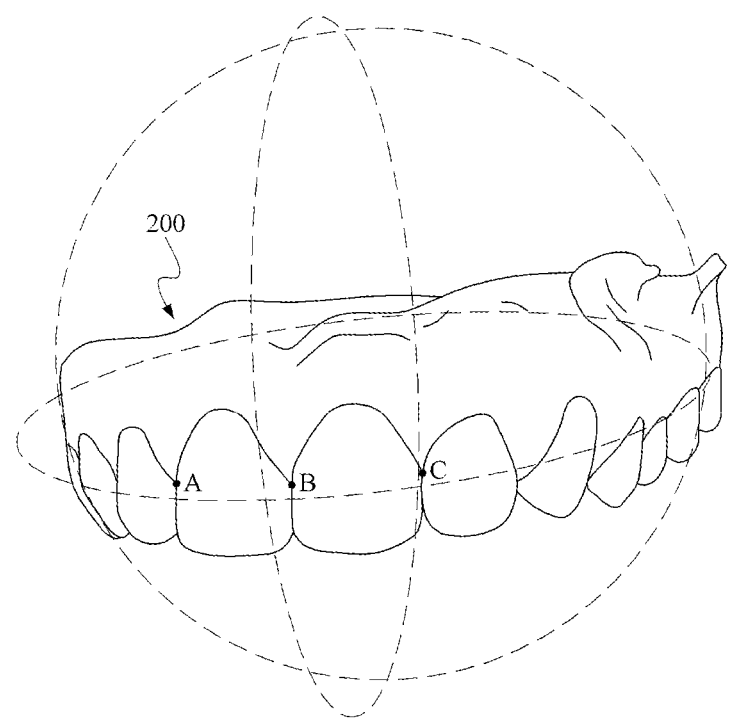
FIG. 7 is a schematic diagram of a preset three-dimensional tooth model in an embodiment.

FIG. 7 is a schematic diagram of a preset stereo tooth model 200 in an embodiment. The feature points indicated as A, B and C are examples of the aforementioned predetermined feature points of the tooth model. In one embodiment, the preset feature points corresponding to the stereo tooth model 200 includes a plurality of preset face feature points (not shown, such as feature points located in mouth or nose) in addition to the preset tooth model feature points A, B and C. The data is pre-stored in a memory or a cloud database, and then selected when needed.

Furthermore, in step 150, the stereo tooth model 200 is converted to a planar projection image projected to the face image using the preset feature points of the stereo tooth model 200 (such as the feature points A, B, C in FIG. 7). This stereoscopic conversion to planar projection technology is a currently used image processing technology and is not described here.

Subsequently, comparing the distance of the preset tooth model feature points A', B', C' (corresponding to the feature points A, B, C in FIG. 7) projected on the face image with the distance of the corresponding tooth image feature points Qa, Qb, Qc, to adjust (eg, zoom) the stereo tooth model feature points A, B, C meet these tooth image feature points Qa, Qb, Qc. For example, the distance between the preset tooth model feature points A' and C' projected to the face image and the distance between the corresponding tooth image feature points Qa and Qc are calculated, and then the stereo tooth model is adjusted by the ratio of the two distances.

Then, in step S160, the adjusted stereo tooth model is projected to a face video using the preset feature points corresponding to the stereo tooth model (such as the preset tooth model feature points A, B, C in FIG. 7 and the corresponding preset face feature points). In one embodiment, the scaling proportion calculated in step S150 is to adjust the position of the scaled preset feature point, and then the adjusted preset feature point is adjusted so as to project the adjusted three-dimensional tooth model projection on the face video so as to cover the original tooth image.

Finally, in step S170, after the tooth image 330 is removed, the image of the mouth area 320 is superimposed on the face video to cover the projection image of the protruding tooth model. In this step, the tooth image 330 is removed from the image of the mouth area 320, and then the image of the mouth area 320 is superimposed on the face video to present the simulated video after orthodontics, which is not limited herein. In another embodiment, the image of the lip portion is captured from the mouth area 320 and superimposed on the face video to present the simulated video after orthodontics.

In an embodiment, prior to acquiring the tooth image 330, the image simulation method described above performs step S130 to confirm that the tooth image 320 exists in the mouth area 320. In another embodiment, this confirming step is omitted, and subsequent steps are performed directly from acquiring the tooth image 330 from the mouth area 320.

Figure 8:
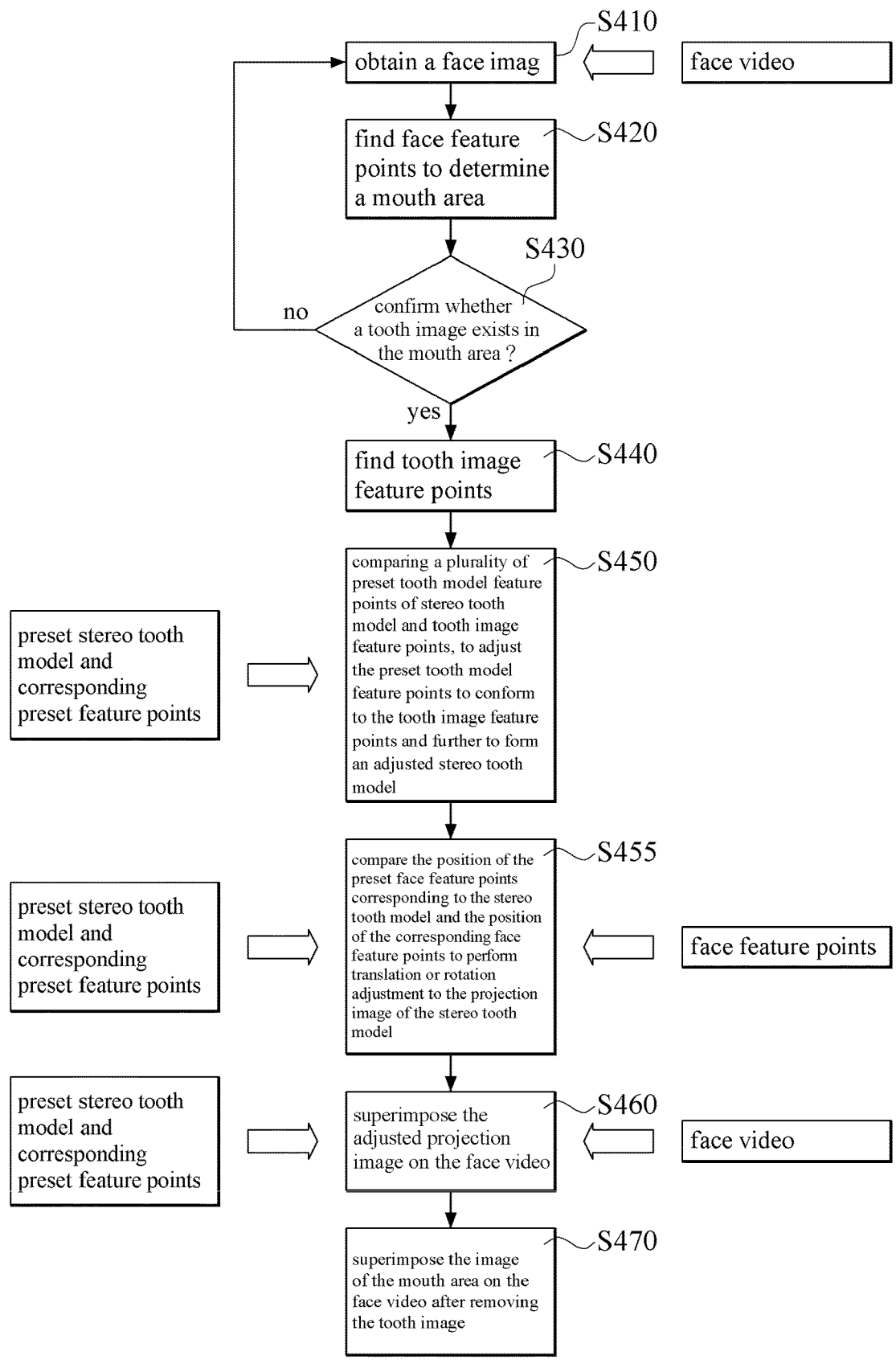
FIG. 8 is a flowchart of an image simulation method for orthodontics in another embodiment.

FIG. 8 is a flowchart of an image simulation method for orthodontics in another embodiment. Steps S410 to S470 of the present embodiment are substantially the same as steps S110 to S170 of the image simulation method of FIG. 1, and will not be described in detail herein. However, after completing step S450, the present embodiment performs displacement rotation adjustment on the projection image of the stereoscopic tooth model (that is, step S455 in the drawing).

In step S455, comparing the position of the preset face feature points corresponding to the stereo tooth model (for example, the position of the feature points of the mouth and the nose) and the position of the corresponding face feature points P to perform translation or rotation adjustment to the projection image of the stereo tooth model. Next, step S460 is performed, and the adjusted projection image is superimposed on the face video to cover the original tooth image.

Figure 9:
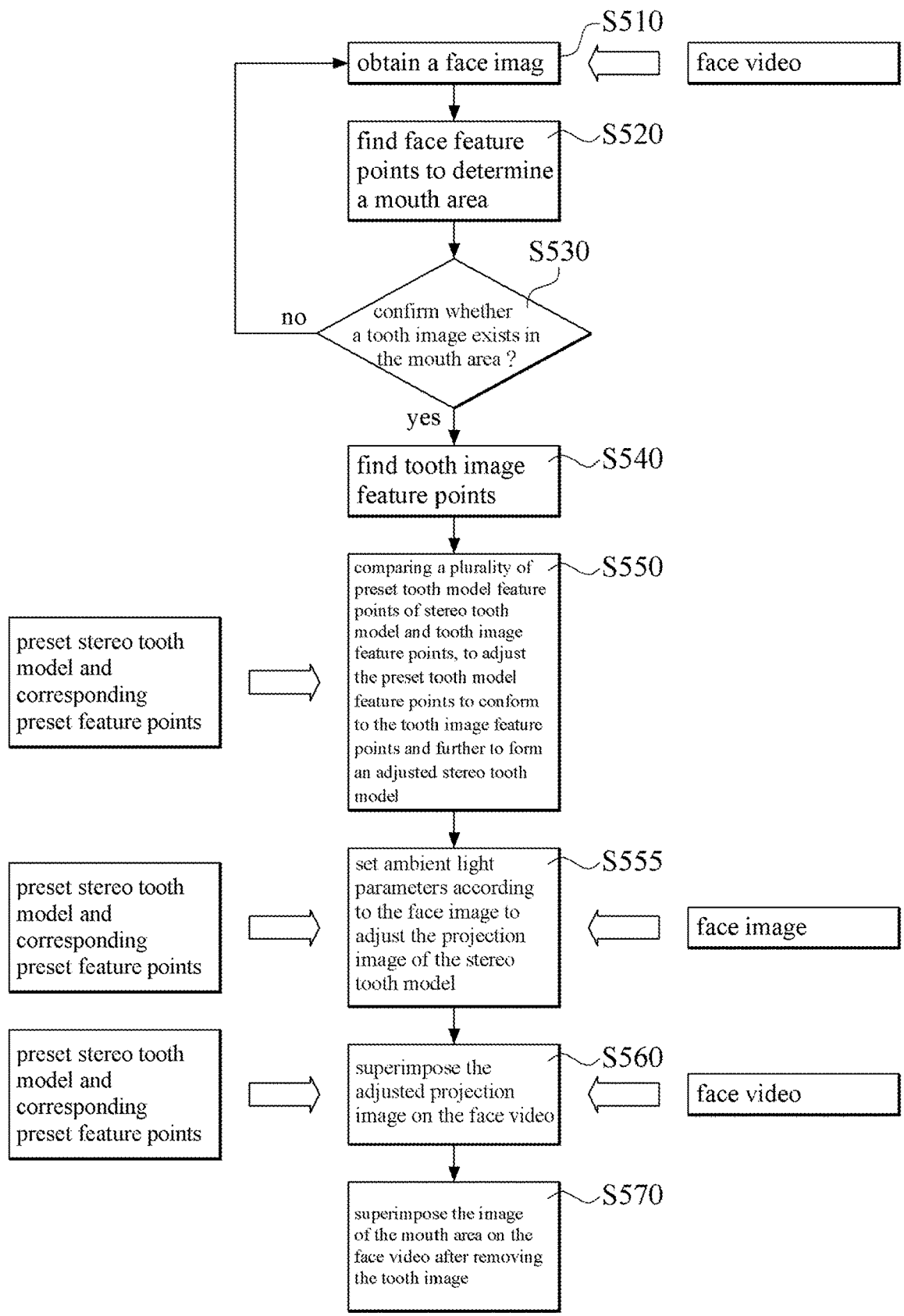
FIG. 9 is a flowchart of an image simulation method for orthodontics in another embodiment.

FIG. 9 is a flowchart of an image simulation method for orthodontics in another embodiment. Steps S510 to S570 of the embodiment are substantially the same as steps S110 to S170 of the image simulation method of FIG. 1, and will not be described in detail herein. However, after completing step S550, the embodiment executes a light adjustment step (that is, step S555 in the drawing).

In step S555, according to the face image, the brightness distribution in the picture is analyzed to set ambient light parameters, and then the ambient light parameters are used to adjust the color and brightness of the projection image of the stereo tooth model. Next, step S560 is performed to superimpose the adjusted projection image on the face video to cover the original tooth image. In this way, the tooth projection image superimposed on the face video is more realistic.

Figure 10:
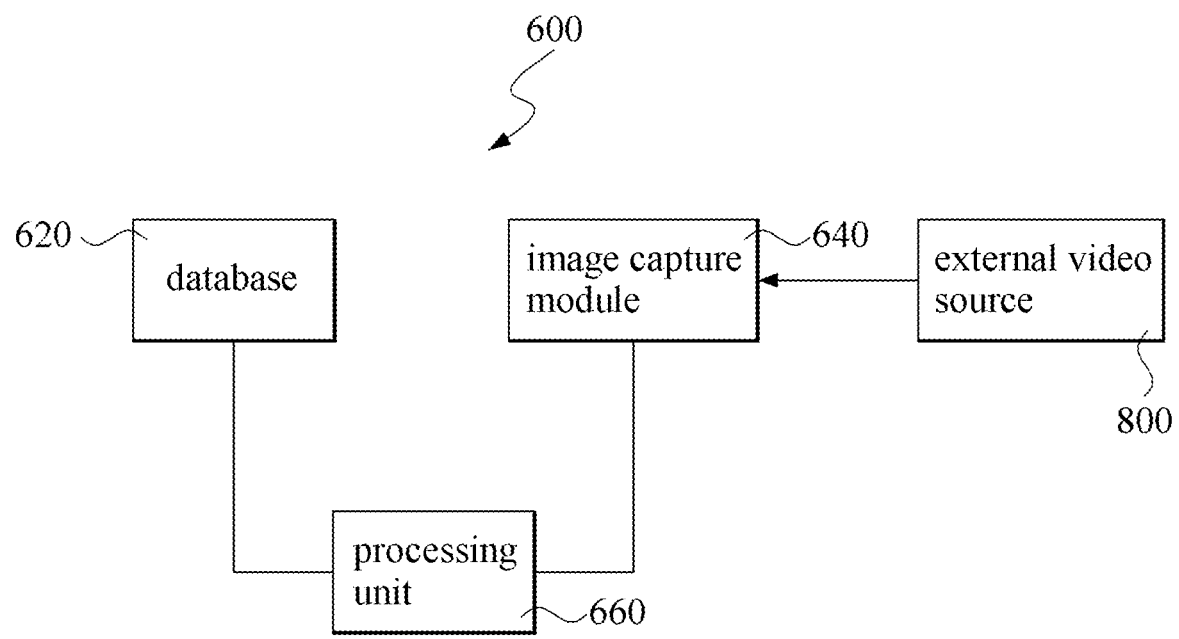
FIG. 10 is a block diagram of an image simulation device for orthodontics in an embodiment.

FIG. 10 is a block diagram of an image simulation device for orthodontics in an embodiment. As shown, the image simulation device 600 includes a database 620, an image capture unit 640 and a processing unit 660. Wherein the database 620 stores a preset stereo tooth model 200 as shown in FIG. 7 and a plurality of preset feature points A, B, C corresponding to the stereo tooth model 200.

The image capture unit 640 is configured to receive a face video and acquire a face image 300 therefrom. For example, the image capture unit 640 is electrically connected to the external video source 800 to receive the face video to capture the face image 300 for subsequent processing.

The processing unit 660 is electrically connected to the database 620 and the image capture unit 640, and acquires the preset stereo tooth model 200 as shown in FIG. 7, and the plurality of preset feature points A, B, C corresponding to the stereo tooth model 200 and the aforementioned face image 300, to perform the image simulation process as shown in the embodiment of FIG. 1, FIG. 8, or FIG. 9. This section is detailed in the corresponding paragraphs of FIG. 1, FIG. 8 and FIG. 9, and will not be repeated here.

Figure 11:
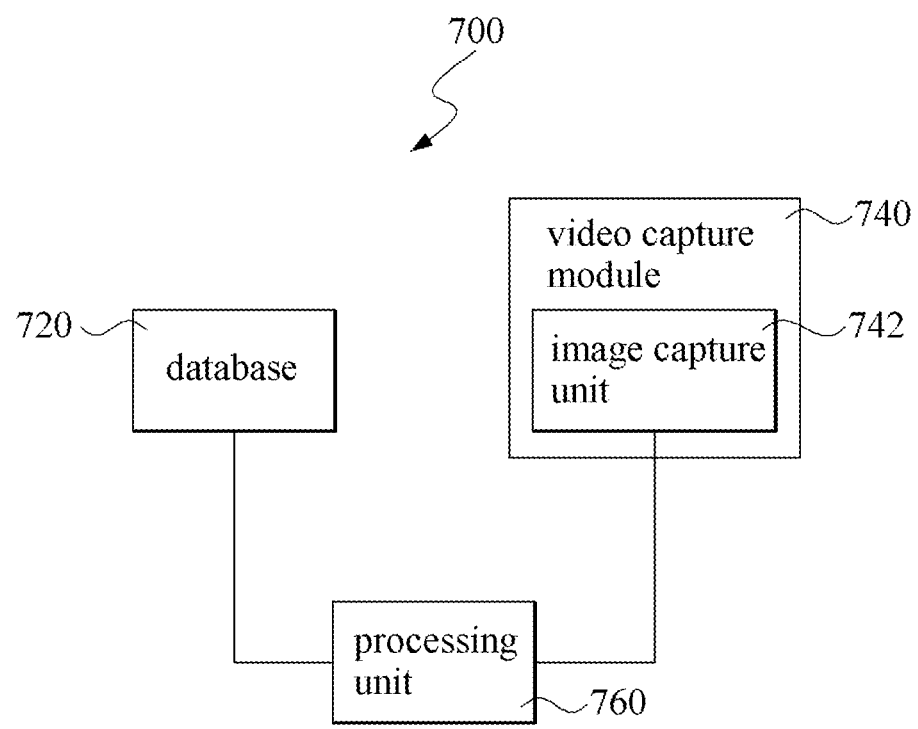
FIG. 11 is a block diagram of an image simulation device for orthodontics in an embodiment.

FIG. 11 is a block diagram of an image simulation device for orthodontics in an embodiment. As shown, the image simulation device 700 includes a database 720, a video capture module 740, and a processing unit 760. The database 720 is used to store the preset stereo tooth model 200 and a plurality of the preset feature points A, B, C. corresponding to the stereo tooth model 200 as shown in FIG. 7.

The video capture module 740 is used to capture a face image to generate a face video. For example, the video capture module 740 is a camera module built into the handheld electronic device. The video capture module 740 has an image capture unit 742 to perform the action of the capture the face image 300.

The processing unit 760 is electrically connected to the database 720 and the video capture module 740, and acquires the preset the stereo tooth model 200 as shown in FIG. 7, the preset feature points A, B, C corresponding to the stereo tooth model 200, and the face image 300 described above, to perform the image simulation process as shown in the embodiment of FIG. 1, FIG. 8, or FIG. 9. This section is detailed in the corresponding paragraphs of FIG. 1, FIG. 8 and FIG. 9, and will not be repeated here.

The aforementioned FIG. 10 and FIG. 11 implement the image simulation method of the present invention in a hardware manner, which is not limited thereto. The image simulation method of FIG. 1, FIG. 8 and FIG. 9 may also be implemented by a computer using program code. For example, the program code of the computer includes a first program code, a second program code, and a third program code, for describing the database 620, the image capture unit 640, and the processing unit 660 operation in FIG. 10 respectively.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. An image simulation method for orthodontics, comprising:
   receiving a face video and capturing a face image from the face video;
   finding a plurality of face feature points on the face image to determine a mouth area;
   acquiring a tooth image in the mouth area;
   defining a plurality of tooth image feature points according to the tooth image;
   comparing a plurality of preset tooth model feature points of a stereo tooth model and the plurality of tooth image feature points, to adjust the plurality of preset tooth model feature points to conform to the plurality of tooth image feature points and further to form an adjusted stereo tooth model; and
   projecting the adjusted stereo tooth model to the face video,
   wherein the step of defining the plurality of tooth image feature points comprises:
   comparing relative positions of a plurality of candidate feature points and the plurality of face feature points which are located in the mouth area to define the plurality of tooth image feature points from the plurality of candidate feature points,
   wherein the step of finding a plurality of face feature points on the face image to determine a mouth area comprising defining a face area by the plurality of face feature points and defining a range of one-third below the face area as the mouth area,
   wherein the step of defining the plurality of tooth image feature points comprises:

performing an edge detection to the tooth image to generate a tooth edge image; and performing a corner detection to the tooth edge image to define the plurality of candidate feature points, wherein the step of defining the plurality of tooth image feature points further comprises:

defining at least two candidate feature points which are closest to the plurality of face feature points as the plurality of tooth image feature points from the plurality of candidate feature points.

2. The image simulation method for orthodontics according to claim 1, before the step of acquiring the tooth image, further comprising:

determining whether the tooth image exists in the mouth area or not; and sending a caution signal when no tooth image exists.

3. The image simulation method for orthodontics according to claim 1, wherein the step of acquiring the tooth image comprises: determining whether the tooth image exists in the mouth area or not by color conversion.

4. The image simulation method for orthodontics according to claim 1, wherein the step of adjusting the stereo tooth model comprises:

projecting the stereo tooth model to the face image according to the preset tooth model feature points and a plurality of preset face feature points corresponding to the stereo tooth model, comparing a distance among the preset tooth model feature points projected on the face image and a distance among the plurality of tooth image feature points to adjust the stereo tooth model.

5. The image simulation method for orthodontics according to claim 4, after the step of adjusting the stereo tooth model, further comprising:

comparing the plurality of preset face feature points and the corresponding plurality of face feature points, and performing translation or rotation adjustment to a projection image of the stereo tooth model.

6. The image simulation method for orthodontics according to claim 1, before the step of projecting the stereo tooth model to the face video, further comprising:

setting ambient light parameters according to the face image to adjust a projection image of the stereo tooth model.

7. An image simulation device for orthodontics, comprising: a database, storing a preset stereo tooth model and a plurality of preset feature points corresponding to the stereo tooth model, the plurality of preset feature points including a plurality of preset face feature points and a plurality of preset tooth model feature points;

an image capture unit, receiving a face video, and capturing a face image;

a processing unit, electrically connecting with the database and the image capture unit, for:

finding a plurality of face feature points on the face image to determine a mouth area;

acquiring a tooth image in the mouth area;

defining a plurality of tooth image feature points according to the tooth image;

comparing a plurality of preset tooth model feature points of the stereo tooth model and the plurality of tooth image feature points, to adjust the plurality of preset tooth model feature points to conform to the plurality of tooth image feature points and further to form an adjusted stereo tooth model; and projecting the adjusted stereo tooth model to the face video, wherein to define the plurality of tooth image feature points, the processing unit compares relative positions of a plurality of candidate feature points and the plurality of face feature points which are located in the mouth area to define the plurality of tooth image feature points from the plurality of candidate feature points, wherein the step of finding a plurality of face feature points on the face image to determine a mouth area comprising defining a face area by the plurality of face feature points and defining a range of one-third below the face area as the mouth area, wherein the step of defining the plurality of tooth image feature points comprises:

performing an edge detection to the tooth image to generate a tooth edge image; and performing a corner detection to the tooth edge image to define the plurality of candidate feature points, wherein the step of defining the plurality of tooth image feature points further comprises:

defining at least two candidate feature points which are closest to the plurality of face feature points as the plurality of tooth image feature points from the plurality of candidate feature points.

* * * * *